(12) United States Patent
Ogata et al.

(10) Patent No.: US 6,447,917 B2
(45) Date of Patent: Sep. 10, 2002

(54) FRICTION MATERIAL

(75) Inventors: Yoshio Ogata, Kanagawa; Yosuke Sasaki, Tokyo, both of (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/748,267

(22) Filed: Dec. 27, 2000

(30) Foreign Application Priority Data

Dec. 28, 1999 (JP) ............................................ 11-374008

(51) Int. Cl.$^7$ ................................................ B32B 27/00
(52) U.S. Cl. ................. 428/421; 428/292.1; 428/297.4; 428/296.7; 428/311.51; 428/364; 526/254; 526/255; 524/545
(58) Field of Search ................................. 428/421, 422, 428/463, 292.1, 297.4, 296.7, 311.51, 364; 526/254, 255; 524/456, 545, 546

(56) References Cited

U.S. PATENT DOCUMENTS 3,985,661 A * 10/1976 Ikeda et al. .................... 252/12
4,530,881 A * 7/1985 Santoso et al. .............. 428/421
4,830,920 A * 5/1989 Hayashi et al. ............. 428/421

* cited by examiner

Primary Examiner—Merrick Dixon
(74) Attorney, Agent, or Firm—Finnegan, Henderson, Farabow, Garrett & Dunner LLP

(57) ABSTRACT

A friction material for brake including reinforcing fibers, a friction modifier, a lubricant, and a binder, characterized by containing, as a part of the component of the friction modifier, 2 to 5 wt % zeolite, 0.8 to 2 wt % antimony oxide and 0.2 to 1 wt % fluorine based polymer.

1 Claim, No Drawings

FRICTION MATERIAL

BACKGROUND OF THE INVENTION

1. Field of the Invention

The present invention relates to a friction material, and which may be used to such as vehicles to reduce braking noises. More specifically, the present invention relates to a brake pad or a brake lining which may be used to braking a vehicle.

2. Description of the Related Art

A friction material to be used to a brake pad, a brake lining or a clutch facing of vehicles, for example, automobiles, is generally formed as a composite material composed of reinforcing fibers, a friction modifier, a binder, etc.

However, in the vehicle where the friction material has been used to the brake pad, there are some problems. When passing puddles or washing the vehicle, a rotor and the brake pad are wetted by a water. Otherwise, when parking outdoors in night for a long time, the friction material has absorbed a moisture in pores thereof. In such cases, the brake is dragged by a creeping force when starting at low speed and a low frequency noise tend to be generated while the water or the moisture are dried and when a vehicle (for example, an automatic (AT) car) starts, that is, the brake pedal is pressed and the change gear is brought into a running range for loosening until the brake is completely released.

Further, when temperature of the brake is increased by repeating the braking operation and the component contained in the friction material is adhered to the rotor, odd noises of low frequency are created at starting the vehicle also due to stick-slip which might be caused between a film of the component and the friction material.

This odd noise of low frequency issued when starting the vehicle is specifically called as a "creep noise".

The creep noise produced at starting the vehicle is the odd noise of low frequency of about 100 to 400 Hz which is produced due to instantaneous variation of a friction coefficient between the friction material and a counterpart material at ultra low speed. The creep noise gives unpleasant feelings to users in general markets, and recently has been demanded to take any measures.

SUMMARY OF THE INVENTION

It is accordingly an object of the invention to provide a friction material for effectively reducing the creep noise which is produced when starting the vehicle.

Inventors made many studies on kinds of friction modifiers for providing friction materials which may effectively reduce the creep noise generated at starting the vehicle.

As the friction modifier for preventing the creep noise, zeolite, antimony oxide and fluorine based polymer of specified amounts were selected, and noticing an effective prevention of the creep noise by the combination of three components, thus the invention has been attained.

Namely, the invention has solved the problem by a friction material including reinforcing fibers, a friction modifier, a lubricant, and a binder, characterized by containing, as a part of the component of the friction modifier, zeolite in an amount of from 2 to 5 wt %, antimony oxide in an amount of from 0.8 to 2 wt % and fluorine based polymer in an amount of from 0.2 to 1 wt %.

DETAILED DESCRIPTION OF THE PREFERRED EMBODIMENTS

For producing the friction material of the invention, the friction material composed of the reinforcing fibers, the friction modifier, the lubricant, and the binder is mixed with the above mentioned raw materials, previously molded in accordance with ordinary production methods, and thermally formed.

As to the friction material of the invention, the reinforcing fibers may include a heat resistant organic fiber, for example, an aromatic polyamid fiber or a frame resistant acrylic fiber. Above of all, an aramid fiber or an aramid pulp may be preferably used because of high strength and high heat resistance. The preferred aramid fiber and aramid pulp may include Kevlar, a trade name (made by Du Pont) or Twaron, a trade name (made by Twaron Products).

For the binder, there may be enumerated, for example, thermosetting resin such as a phenolic resin (including straight phenolic resin and various phenolic resins modified by rubber), or the like and a polyimid resin.

Further, as the friction modifier for adjusting the friction property of friction coefficient, enumerated are, for example, inorganic friction modifiers such as alumina or silica, magnesia, zirconia, chromium oxide, potassium titanate or quartz, organic friction modifiers such as synthetic rubber, or cashew resin, and as the lubricant, there may be enumerated, for example, graphite or molybdenum disulfide.

According to the invention, the friction modifier for preventing generation of the creep noise is characterized by containing zeolite, antimony oxide, and fluorine based polymer.

For the fluorine based polymer, there may be enumerated ethylene polymer tetrafluoride, tetrafluoroethylene polyethylene hexafluoropropylene copolymer, polyviniliden fluoride and the combination of these elements. Among these elements, the ethylene polymer tetrafluoride is preferred.

As to the mixing amounts of the friction modifier to be used to the friction material of the invention, it is required that zeolite is 2 to 5 wt %, antimony oxide is 0.8 to 2 wt % and fluorine based polymer is 0.2 to 1 wt %.

In case the mixing rate of each of the friction modifiers is less than the lower limit of the specified values, the creep noise will not be effectively eliminated.

On the other hand, if the amount of zeolite is higher than 5 wt %, a wear-resistance is reduced and a commercial value is lowered accordingly. Further, if the amount of antimony oxide is higher than 2 wt %, a fade-resistance is lowered. Further, if the amount of fluorine based polymer ia higher than 1 wt %, the braking effect is decreased.

The brake pad is produced in that a sheet is pressed into a predetermined shape, subjected to a degreasing treatment and a primer treatment, and a pressure plate coated with an adhesive and a pre-formed body are formed at a predetermined temperature and at a predetermined pressure in a thermally forming procedure into an integral combination of both members, and this combination passes through an after cure and a finally finishing treatment, said pre-formed body being formed by mixing the reinforcing fibers of heat resistant organic fiber, the lubricant, the friction modifier and the binder of heat setting resin, and forming (preforming) the friction modifier completely homogenized by stirring, at room temperature and at a predetermined pressure. The above mentioned steps are the same as those of the prior art.

The invention will be specifically described in reference to an Example. It should, however, be noted that the invention is not limited thereto.

EXAMPLE (Material of the Samples for the Friction Material)

As materials for producing the samples of the friction material, the followings were employed, and for making the samples, selected materials therefrom were prepared, and mixtures for the samples were varied respectively.

Binder
 . . . Phenolic resin

Friction modifiers for preventing the creep noise
 . . . Zeolite/antimony oxide/ethylenepolymer tetrafluoride Other friction modifiers
 . . . Cashew dust, potassium titanate, magnesia Lubricants
 . . . Graphite, molybdenum disulfide Reinforcing fiber
 . . . Aramid fiber, aramid pulp (Composition of the Samples for Friction Material)

As the compositions for producing for the friction material, the Examples 1 to 8 were made with the mixing rates as shown in Table 1.

For comparison, there were prepared the sample without mixing zeolite. (Comparative Example 1), the sample without mixing antimony oxide (Comparative Example 2), and the sample without mixing fluorine based polymer (Comparative Example 3).

(Production of the Friction Material Samples)

The friction materials for brake pad were made of the samples of the above mentioned compositions through a prior art process.

TABLE 1

Unit: Weight %

|  | A | Aramid fiber, Aramid pulp | B | Zeolite | Antimony Oxide | C | D |
|---|---|---|---|---|---|---|---|
| Ex. 1 | 20 | 12 | 15 | 2 | 0.8 | 0.2 | 50 |
| Ex. 2 | 20 | 12 | 15 | 2 | 2 | 0.2 | 48.8 |
| Ex. 3 | 20 | 12 | 15 | 2 | 0.8 | 1 | 49.2 |
| Ex. 4 | 20 | 12 | 15 | 2 | 2 | 1 | 48 |
| Ex. 5 | 20 | 12 | 15 | 5 | 0.B | 0.2 | 47 |
| Ex. 6 | 2Q | 12 | 15 | 5 | 2 | 0.2 | 45.8 |
| Ex. 7 | 20 | 12 | 15 | 5 | 0.8 | 1 | 46.2 |
| Ex. 8 | 20 | 12 | 15 | S | 2 | 1 | 45 |
| Com. 1 | 20 | 12 | 15 | 0 | 0.8 | 1 | 51.2 |
| Com. 2 | 20 | 12 | 15 | 2 | 0 | 0.2 | 50.8 |
| Com. 3 | 20 | 12 | 15 | 2 | 0.8 | 0 | 50.2 |

Ex.: Examples
Com.: Comparative examples
A: Phenolic resin;
B: Lubricant;
C: Ethylene polymer tetrafluoride;
D: Other friction modifier (Testing Method)

A vehicle equipped with a new rotor and a disc brake having the brake pad composed of the friction material of the above mentioned sample was braked to stop at an initial speed of 50 km/h every 1 km travelling over 200 km, and after a sufficient sliding contact between the friction material and the rotor was obtained, the following tests were performed.

(Test at Moistening)

The vehicle was left in an environmental chamber for 12 hours at temperature 20° C. and humidity 95% (RH), and then functional tests were carried out 10 times with respect to generation of the creep noise at speed of 20 km/h and after braking at speed reduction 0.2 G.

(Test at Increasing Temperature)

The functional tests were carried out 10 times with respect to generation of the creep noise in the course of temperature variation of the friction material at 50° C.–200° C. at an initial speed of 30 km/h and by braking at speed reduction 0.3 G.

(Test at Wetting with Water)

The rotor and the friction material were applied with water of 10 liters per minute to the right and left wheels for 1 minute respectively, and for 2 minutes in total. The functioning tests were carried out 10 times with respect to generation of the creep noise at speed of 20 km/h and after braking speed reduction 0.2 G.

(Results)

The tested results are shown in Table 2.

The results in Table 2 indicate magnitude of the largest sounds of the tests of 10 times.

A passed level at absorbing humidity is "very small" or less, and at heightening temperature and water wetting the passed level is "small" or less.

TABLE 2

|  | At moistening | At increasing temperature | At wetting with water | All round evaluations |
|---|---|---|---|---|
| Ex. 1 | Very small | Small | Small | Passed |
| Ex. 2 | Very small | Very small | Very small | Passed |
| Ex. 3 | Very small | Very small | Very small | Passed |
| Ex. 4 | Very small | Very small | Very small | Passed |
| Ex. 5 | Very small | Small | Small | Passed |
| Ex. 6 | Very small | Very small | Very small | Passed |
| Ex. 7 | Very small | Very small | Very small | Passed |
| Ex. 8 | Very small | Very small | Very small | Passed |
| Com. 1 | Very small | Middle | Small | Not passed |
| Com. 2 | Small | Large | Small | Not passed |
| Com. 3 | Small | Middle | Large | Not passed |

Ex.: Examples
Com.: Comparative examples

According to the invention, the creep noise generated at starting the vehicle (for example, an automatic (AT) car) may be effectively reduced by using, as the friction modifier, zeolite, antimony oxide and fluorine based polymer of predetermined amounts to the friction material including the reinforcing fibers, the friction modifier, the lubricant and the binder.

What is claimed is:

1. A friction material comprising:

reinforcing fibers;

a friction modifier including zeolite in an amount of from 2 to 5 wt %, antimony oxide in an amount of from 0.8 to 2 wt %, and fluorine based polymer in an amount of from 0.2 to 1 wt %;

a lubricant; and a binder.

* * * * *

UNITED STATES PATENT AND TRADEMARK OFFICE
CERTIFICATE OF CORRECTION

PATENT NO.     : 6,447,917 B2
DATED          : September 10, 2002
INVENTOR(S)    : Yoshio Ogata et al.

It is certified that error appears in the above-identified patent and that said Letters Patent is hereby corrected as shown below:

<u>Title page,</u>
Item [73], "Assignee", should read -- Assignees: --, and after "Nissan Motor Co., Ltd., Kangawa", insert --; Akebono Brake Industry Co., Ltd Tokyo, both of --

Signed and Sealed this

Twentieth Day of May, 2003

JAMES E. ROGAN
*Director of the United States Patent and Trademark Office*